3,305,426
DEVICE AND METHOD FOR INSERTING A
SLEEVE IN A CABLE
Donald MacLaughlin, Lakewood, and Milton H. Schug, Palos Verdes Estates, Calif., assignors to CEMSCO, Wilmington, Calif., a corporation of California
Filed Dec. 4, 1963, Ser. No. 328,092
11 Claims. (Cl. 156—294)

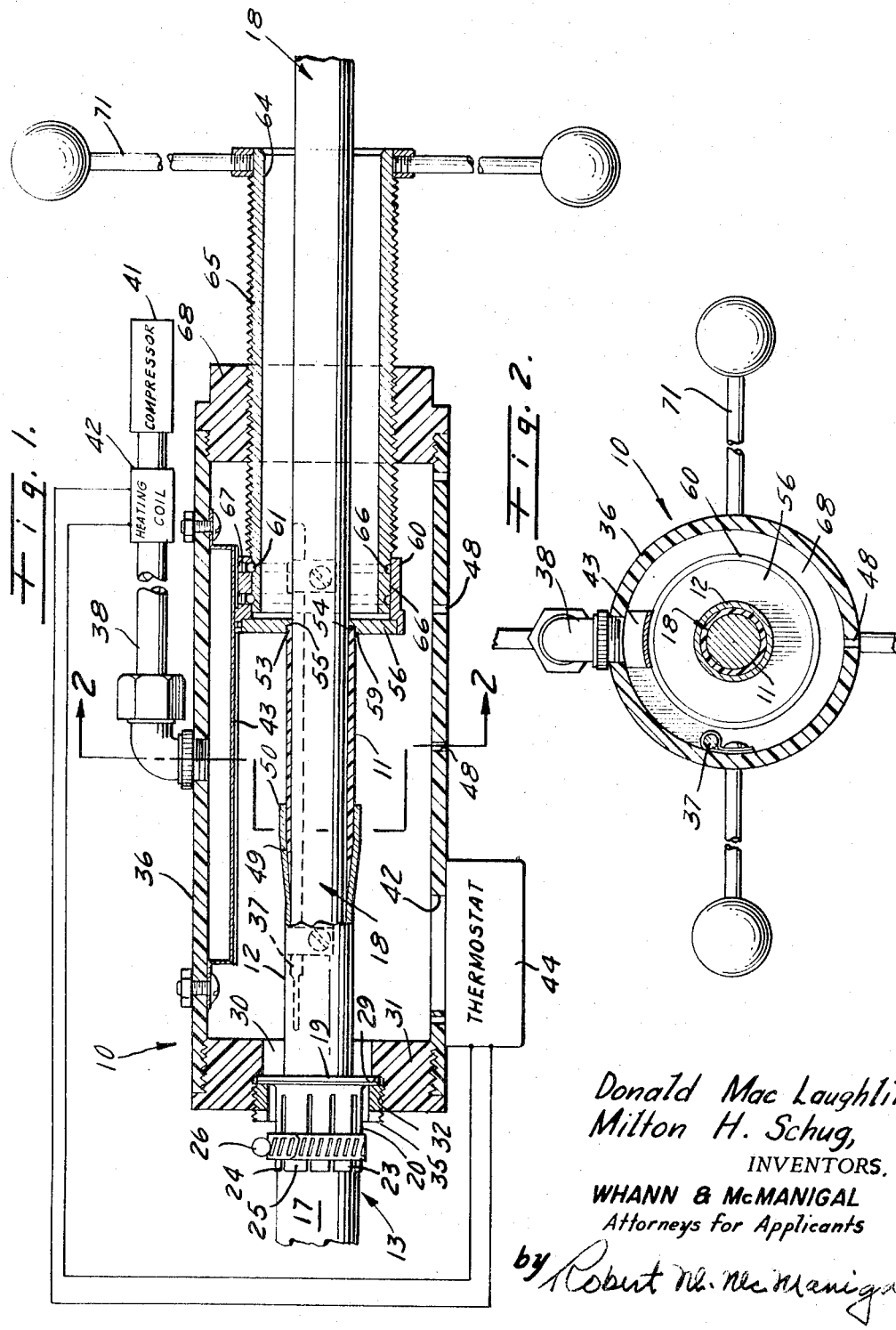

This invention relates to a method and apparatus for inserting a relatively rigid sleeve between a protective covering on a cable and another layer or covering or between a protective covering and the actual bundle of conductors forming the cable.

In modern cables, heat sensitive plastics, such as, polyethylene, are used as insulating proctective coverings. Communication cables have various layers of protective coverings and the inner insulation layer, surrounding the actual conductors, frequently is a gas jacket, carrying gas under pressure. Thus, where the cables are spliced together, a seal must be provided around the splice and between the two ends of the gas jacket adjacent the splice.

It is difficult to form a seal around a typical polyethylene gas jacket, immediately surrounding a bundle of conductors, because the surface of the gas jacket is irregular. It has been found that good seals can be formed on an otherwise irregular gas jacket if a rigid sleeve has been inserted between the gas jacket and the bundle of conductors, or between any irregular plastic covering and the next immediately inwardly layer of a cable structure. Such a sleeve supports a polyethylene jacket to give it a sufficiently regular cylindrical surface so that an elastomeric sealing member will provide an adequate seal on the jacket.

It is an object of the present invention to provide a method and apparatus for inserting a rigid sleeve between two layers of a cable structure or between one layer of a cable structure and a bundle of conductors, the outer layer in each case being a heat sensitive plastic.

It is another object of the present invention to provide an apparatus in which a heat sensitive plastic cable covering may be heated to the proper temperature, after which the heat will be automatically shut off to avoid overheating of the plastic and at which time a rigid sleeve can be forced between the heat sensitive covering and the next inner portion of the cable. The heat prevents creation of stresses in the plastic.

It is still another object of the present invention to provide an apparatus in which a rigid sleeve can be much more rapidly inserted between a heat sensitive protective layer on a cable and the next inner portion of the cable than was heretofore possible. The saving of time in inserting the sleeves in the cable also greatly reduces the cost of the operation.

It is a further object of the present invention to provide a method and apparatus for forming a sealable cylindrical surface on an irregular heat sensitive protective covering on cables.

It is a still further object of the present invention to provide a method and apparatus for forming a sealable surface on a typical polyethylene gas jacket immediately surrounding a bundle of cable conductors.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a cross sectional elevational view of a device, according to the invention, for inserting a sleeve under a heat sensitive cable covering; and FIG. 2 is a cross sectional view, taken as indicated by the line 2—2 in FIG. 1.

Referring again to the drawings, there is shown a device, generally designated as 10, according to the invention, for inserting a sleeve 11 under a heat sensitive protective covering 12, such as, polyethylene, of a cable, generally designated as 13.

The cable 13 may typically have five protective layers in the form of an outer insulating polyethylene layer 17; an armor layer immediately inwardly of the latter, not shown; an intermediate layer of polyethylene insulating material, not shown; a next inner, shielding layer, not shown; and the inner polyethylene layer or gas jacket 12 immediately surrounding a bundle of conductors, generally designated as 18, or what might be another protective layer.

The cable 13, as shown, has been prepared for splicing by the removal of the armor layer, the intermediate insulating layer, and the shielding layer, to the right in FIG. 1 of the inner end 19 of the bushing clamp 20. That is, the aforesaid layers have been stripped from the cable, leaving the conductors 18 extending outwardly from the inner protective layer 12. The bushing clamp 20 is comprised of an outer slotted sleeve 23, the slots 24 being circumferentially spaced to form spring gripping fingers 25. The bushing 20 is clamped securely on the layer 17 by means of a band clamp 26. At the inner end 19, there is a radially directed flange which is in abutment with the ends of one or more layers of the cable which have been stripped, as previously indicated.

The end 19 of the bushing is in abutment with a shoulder 29 immediately surrounding a central opening 30 of end plate 31. Outwardly of the shoulder 29 is a threaded bore 32 in which a nut 35 is threadedly engaged to secure the bushing 20 and the cable within the closure plate 31.

The plate 31 is threadedly engaged with and so as to form a closed end of a cylindrical member 36 forming a chamber or housing of the device 10. The cylinder 36 must either be transparent or must have a window so that the sleeve inserting operation therein can be watched and so that the thermometer 37 secured to the cylinder wall can be read. The device shown is made of Lucite, but other material may be used, such as, metal with a window.

At the upper end of the cylinder 36 is a tubular fitting 38, open to the interior of the cylinder so as to provide a conduit for hot air to the interior of the chamber. The air is supplied by a compressor 41 and the compressed air is passed over an electrical heating coil 42 and then through the fitting 38 into the chamber 36. Immediately inwardly of the fitting 38 and radially spaced from the wall of the chamber, extending longitudinally, is a baffle 43, to disperse the hot air.

Secured at the lower end of the chamber 36 is a thermostat 44, the thermostat being exposed to the air within the chamber through the opening 47. The thermostat is connected to the heating coil and is set so that when the proper temperature is obtained within the chamber, the heating coil shuts off. Also, along the lower portion of the chamber are a plurality of openings 48 to permit the exodus of air from the chamber so that the air from the compressor can continue to flow into the chamber.

The sleeve 11 is made of a rigid phenolic material and has a conical end 49 to permit easier insertion of the sleeve under the end 50 of the protective layer 12. The other end 53 of the sleeve 11 is in a counterbore 54 surrounding opening 55 of a cylindrical plate 56. A beveled surface 59 is formed outwardly of the bore 54 to permit the easy placement of the bore 54 onto the sleeve.

The plate 56 is secured in a cylindrical member 60 which is bearing mounted by means of ball bearings 61 on a smooth cylindrical surface 62 of a threaded driving cylinder 65 having a central opening 64. The bearings 61 are rotatable in grooves 66 in the cylindrical surface 62 and are held in place by means of set screws 67. The driving cylinder 65 is threadedly engaged within end closure 68, in turn threadedly engaged in the end of the chamber 36. On the outer end of the driving cylinder are four radially directed handles 71 at 90° to each other for the purpose of rotating the drive cylinder by hand.

In operation, the cable 13, as previously indicated, is stripped to expose the conductors for splicing. After this has been accomplished, prior to splicing the cable, a sealable surface must be provided on the exterior of the polyethylene heat sensitive cover 12. The normal surface of the cover 12 is irregular and, according to the invention, a phenolic sleeve 11 is inserted between the conductors and the cover 12 to provide a regular cylindrical surface on the latter.

The sleeve is first slipped over the conductors 18 and is moved up to the end 50 of the cover 12. Before inserting the cable in the sleeve inserting device 10, the sleeve must be inserted a small distance into the end 50. This is accomplished by heating the end 50 with hot air so the end is soft enough to permit entry of the end of the sleeve by hand forcing. After this has been accomplished, the slotted sleeve 23 is clamped onto layer 17 and the cable is inserted through the opening 55 in the plate 56 and through the opening 64 of the driving cylinder 65. At this time, the plate 56 is to the right of the sleeve 11. Next, the flange of the bushing 20 is moved into abutment with the shoulder 29 and the nut 35 is tightened to secure the cable within the chamber 36.

The cable conductors 18 are held as necessary while the handles 71 are rotated by hand to rotate the drive cylinder 65 until the plate 56 makes contact with the sleeve. Because of the beveled opening in the plate, the plate is easily moved onto the sleeve so that the latter fits into the counterbore 54. At this time, the compressor 41 and the heating coil 42 are energized and the hot air is caused to flow through the fitting 38 into the chamber 36. When the temperature within the chamber is raised to about 175° F., the polyethylene cable is then generally between 170° and 175° F. and in this range of temperatures, the polyethylene is softened enough to permit the full insertion of the sleeve 11 under the polyethylene cover 12 by the rotation of the handle 71 and the cylinder 65. As the driving cylinder 65 exerts a pressure on the sleeve and, in turn, a pressure on the cylindrical member 60, the sleeve and the latter will tend not to rotate and move only linearly in the longitudinal direction as the cylinder 65 both rotates and moves in the longitudinal direction. The bearings 61 permit easy relative rotation between the cylindrical member 60 and the surface 62 of the driving cylinder.

As a matter of practice, after the hot air is permitted to flow into the cylinder, the operator watches the thermometer 37 until it shows a temperature of about 175° F. and then he starts the rotation of the driving cylinder. As previously indicated, at this time, the cable should be between 170° and 175° F. to permit the relatively easy insertion of the sleeve. If the temperature of the cable is raised much above 170° F., the polyethylene will tend to wrinkle while the sleeve is being exerted against its inner surface so as to provide an unsatisfactory sealing surface on the exterior of the former. Therefore, the operator must set the thermostat at a temperature somewhat higher than 170° F., but not substantially higher, so that the heat will shut off before the cable becomes too hot. For the present embodiment, to insert a sleeve under a polyethylene layer, the thermostat is set at about 175° F. and this prevents the cable temperature from rising above about 170° F. at the time the thermostat shuts off the heating coil.

According to the invention, it has been found that by having the plastic at the proper temperature during insertion of the sleeve, no stresses are created in the plastic. Forced insertion of a sleeve without heating the plastic sets up stresses in the plastic so that it cracks at low temperatures to which it is likely to be subjected.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example. We do not wish to be restricted to the specific form shown or uses mentioned, except as defined in the accompanying claims, wherein various portions have been separated for clarity of reading and not for emphasis.

We claim:

1. A device for inserting a sleeve between an inner cable portion and a heat sensitive protection covering of said cable, comprising:
   (a) an elongated, closed housing;
   (b) means to secure said cable at one end of said housing;
   (c) a heat source for said housing;
   (d) means to control the heat source to regulate the temperature within said housing;
   (e) support means within said housing to guide and support a sleeve to be inserted between a heat sensitive covering on said cable and an inner portion of said cable; and
   (f) means to drive said support means linearly in said housing to insert said sleeve in said cable.

2. A device for inserting a sleeve between an inner cable portion and a heat sensitive protective covering of said cable, comprising:
   (a) an elongated, closed housing;
   (b) means to secure said cable at one end of said housing;
   (c) a heat source for said housing;
   (d) means to control the heat source to regulate the temperature within said housing;
   (e) support means within said housing to guide and support a sleeve to be inserted between a heat sensitive covering on said cable and an inner portion of said cable;
   (f) an opening in said means at said one end to permit said cable covering and cable to extend therethrough and into said housing;
   (g) an opening in said support means to permit said inner portion of said cable to extend therethrough;
   (h) means to drive said support means linearly in said housing to insert said sleeve in said cable; and
   (i) an opening in said drive means to permit said cable to extend out of the other end of said housing.

3. A device for inserting a sleeve between an inner cable portion and a heat sensitive protective covering of said cable, comprising:
   (a) an elongated, closed housing;
   (b) means to secure said cable at one end of said housing;
   (c) a hot air supply tube connected to said housing;
   (d) a thermostat on said housing to control the air temperature to said supply tube to said housing;
   (e) openings in said housing to permit air to flow out of said housing;
   (f) support means within said housing to guide and support a sleeve to be inserted between a heat sensitive covering on said cable and an inner portion of said cable; and
   (g) means to drive said support means linearly in said housing to insert said sleeve in said cable.

4. A device for inserting a sleeve between an inner cable portion and a heat sensitive protective covering of said cable, comprising:
(a) an elongated, closed housing;
(b) means to secure said cable at one end of said housing;
(c) a hot air supply tube connected to said housing;
(d) a thermostat on said housing to control the air temperature to said supply tube to said housing;
(e) openings in said housing to permit air to flow out of said housing;
(f) support means within said housing to guide and support a sleeve to be inserted between a heat sensitive covering on said cable and an inner portion of said cable;
(g) an opening in said means at said one end to permit said cable covering and cable to extend therethrough and into said housing;
(h) an opening in said support means to permit said inner portion of said cable to extend therethrough;
(i) means to drive said support means linearly in said housing to insert said sleeve in said cable; and
(j) an opening in said drive means to permit said cable to extend out of the other end of said housing.

5. A device for inserting a sleeve between an inner cable portion and a heat sensitive protective covering of said cable, comprising:
(a) an elongated, closed housing;
(b) means to secure said cable at one end of said housing;
(c) a heat source for said housing;
(d) means to control the heat source to regulate the temperature within said housing;
(e) support means within said housing to guide and support a sleeve to be inserted between a heat sensitive covering on said cable and an inner portion of said cable; and
(f) rotary means to drive said support means linearly in said housing to insert said sleeve in said cable.

6. A device for inserting a sleeve between an inner cable portion and a heat sensitive protective covering of said cable, comprising:
(a) an elongated, closed housing;
(b) means to secure said cable at one end of said housing;
(c) a hot air supply tube connected to said housing;
(d) a thermostat on said housing to control the air temperature to said supply tube to said housing;
(e) openings in said housing to permit air to flow out of said housing;
(f) support means within said housing to guide and support a sleeve to be inserted between a heat sensitive covering on said cable and an inner portion of said cable;
(g) drive means threadedly engaged for rotation in the other end of said housing and when rotated in one direction adapted to move said support means linearly in said housing to insert said sleeve in said cable,
(h) said support means being bearing mounted on said drive means to permit the former to move linearly while the latter moves linearly during rotation; and
(i) means on said drive means to rotate the latter with respect to said housing.

7. A device for inserting a sleeve between an inner cable portion and a heat sensitive protective covering of said cable, comprising:
(a) an elongated, closed housing;
(b) means to secure said cable at one end of said housing;
(c) a hot air supply tube connected to said housing;
(d) a thermostat on said housing to control the air temperature to said supply tube to said housing;
(e) openings in said housing to permit air to flow out of said housing;
(f) a baffle in said housing to deflect hot air entering said housing;
(g) support means within said housing to guide and support a sleeve to be inserted between a heat sensitive covering on said cable and an inner portion of said cable;
(h) an opening in said means at said one end to permit said cable covering and cable to extend therethrough and into said housing;
(i) an opening in said support means to permit said inner portion of said cable to extend therethrough;
(j) drive means threadedly engaged for rotation in the other end of said housing and when rotated in one direction adapted to move said support means linearly in said housing to insert said sleeve in said cable,
(k) said support means being bearing mounted on said drive means to permit the former to move linearly while the latter moves linearly during rotation;
(l) means on said drive means to rotate the latter with respect to said housing; and
(m) an opening in said drive means to permit said cable to extend out of the other end of said housing.

8. A method for inserting a sleeve between an inner portion of a cable and a heat sensitive protective covering, comprising:
(a) placing a sleeve on a part of an inner portion of a cable;
(b) heating the end of said cable covering sufficiently to permit insertion of the sleeve under the end;
(c) guiding said sleeve on said cable to insert a small portion of said sleeve between said heated end of said covering and said inner portion;
(d) heating said covering until a substantial force on said sleeve will push it under said covering; and
(e) forcing said sleeve under said heated covering until the desired amount of the sleeve is between the covering and the inner portion.

9. A method for inserting a sleeve between an inner portion of a cable and a heat sensitive protectiive covering, comprising:
(a) stripping said covering off of a portion of said inner portion of said cable;
(b) heating the end of said cable covering sufficiently to permit the insertion of said sleeve under said end;
(c) guiding said sleeve on said inner portion to insert a small portion of said sleeve between said heated end of said covering and said inner portion;
(d) securing said cable to an end of a chamber with said covering end and said sleeve within said chamber;
(e) putting said inner portion through an opening in a plate;
(f) moving said plate in said chamber on said cable to cause a counterbore surrounding said opening in said plate to be fitted on said sleeve;
(g) heating the interior of said chamber and said cable covering until said covering is soft enough to permit said sleeve to be forced thereunder; and
(h) pushing said plate within said chamber to force said sleeve between said covering and said inner portion.

10. A method for inserting a sleeve between an inner portion of a cable and a polyethylene heat sensitive plastic protective covering, comprising:
(a) stripping said covering off of a portion of said inner portion of said cable;
(b) heating the end of said cable covering sufficiently to permit the insertion of a relatively rigid sleeve under said end;
(c) guiding said sleeve on said inner portion to insert a small portion of said sleeve between said heated end of said covering and said inner portion;
(d) securing said cable to an end of a chamber with said covering end and said sleeve within said chamber;
(e) putting said inner portion through an opening in a plate;
(f) moving said plate in said chamber on said cable to cause a counterbore surrounding said opening in said plate to be fitted on said sleeve;
(g) heating the interior of said chamber and said cable covering until said covering is soft enough to permit said sleeve to be forced thereunder; and
(h) pushing said plate within said chamber to force said sleeve between said covering and said inner portion.

11. The invention according to claim 10 in which said cable covering is heated within said chamber in the range of 170° F. to 175° F.

References Cited by the Examiner

UNITED STATES PATENTS

| 2,803,056 | 8/1957 | Brissey et al. | 156—294 |
| 3,080,269 | 3/1963 | Pollock et al. | 156—294 X |
| 3,184,362 | 5/1965 | Litsky et al. | 156—294 X |

EARL M. BERGERT, *Primary Examiner.*

H. ANSHER, *Assistant Examiner.*